July 20, 1965
E. KRISTAL
3,196,062
PRODUCTION OF EMBOSSED PLASTIC SHEET MATERIAL
Filed Sept. 27, 1961
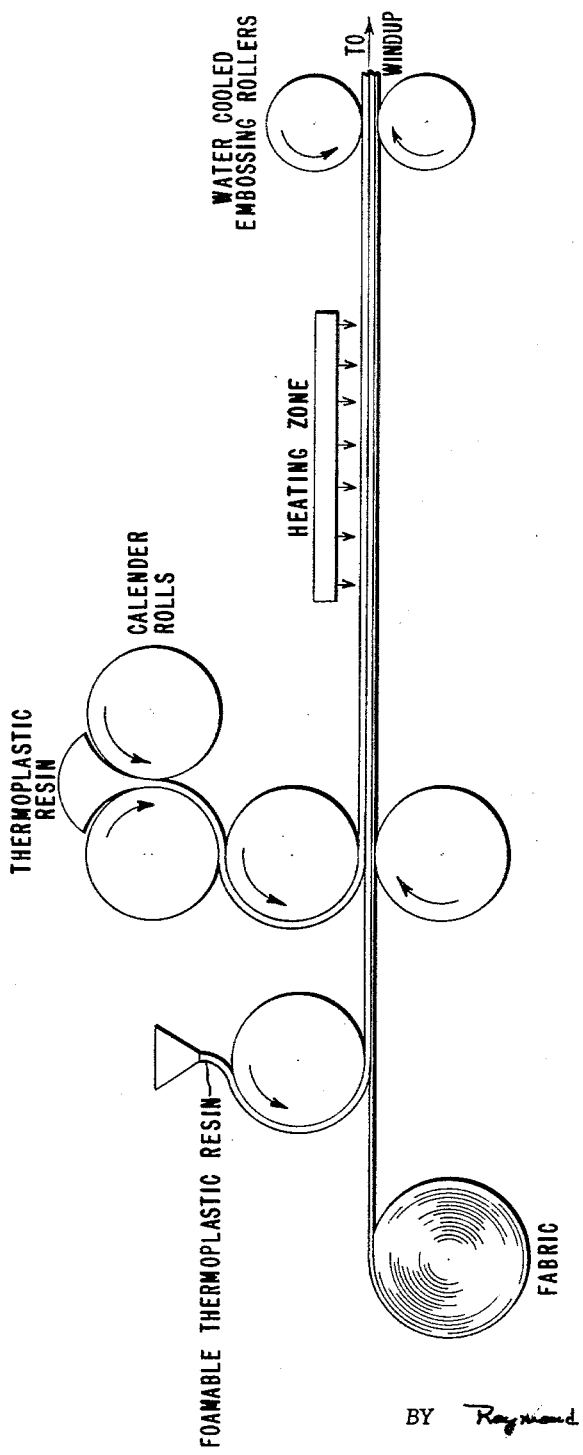
INVENTOR
EDWARD KRISTAL
BY Raymond E. Blomfield
ATTORNEY

United States Patent Office 3,196,062
Patented July 20, 1965

3,196,062
PRODUCTION OF EMBOSSED PLASTIC
SHEET MATERIAL
Edward Kristal, New Windsor, Newburgh, N.Y., assignor to E. I. du Pont de Nemours and Company, Wilmington, Del., a corporation of Delaware
Filed Sept. 27, 1961, Ser. No. 141,022
3 Claims. (Cl. 156—79)

This invention relates to a new and improved method of making sheet materials having an embossed layer of non-foamed plastic in superposed adherence with a layer of foamed plastic. A preferred embodiment of the invention relates to a continuous method of mkaing a flexible, resilient sheet material having an embossed, wear-resistant layer of non-foamed polyvinyl chloride in superposed adherence with a layer of foamed polyvinyl chloride.

The utility of sheet materials comprising a wear-resistant surface layer of thermoplastic resin is well known. Polyvinyl chloride coated fabric is one of the most widely used sheet materials of this type. It can be produced in a variety of attractive colors and durable, easy-to-clean qualities by rapid, efficient continuous methods. For example, a preformed film or a milled composition of plasticized and pigmented polyvinyl chloride can be applied to the fabric by means of a calender to produce continuous lengths of interior trim and upholstery material for automobiles. An important reason for the commercial success of such sheet material is the ease with which it can be embossed with deep grain patterns and other attractive surface textures. As the composite sheet material leaves the calender it can be passed directly through the nip of a conventional roller-type of embosser before it is cooled and wound up on a storage reel.

The conventional roller embosser comprises an engraved embossing roll mounted to roll under strong but yieldable positive pressure against a relatively firm back-up roll, such as a rubber or paper covered steel roll. Since the plastic layer is in a heat-softened highly impressionable state as it enters the nip, it is adapted to accept all the depth and detail of the engraved pattern. The embossed plastic layer is usually cooled below its softening point while still in contact with the engraved embossing roll to set the embossed pattern.

A related sheet material which is recently becoming very popular for certain applications has a layer of foamed plasticized polyvinyl chloride in interposed adherence with the other two layers, that is, between the fabric and the non-foamed polyvinyl chloride surface layer. The low density foam layer enhances such properties as resilience, pliability and fold pattern. But the introduction of the foam layer has been accompanied by serious embossing problems. For example, when the three-layer composite sheet (i.e., plastic film/plastic foam/fabric laminate) is formed by a preferred rapid, continuous method, such as by calendering followed directly or indirectly by heating tunnel expansion of the intermediate layer into a cellular structure, the composite sheet cannot be passed directly from the heating tunnel through a conventional roller embosser without permanently destroying much of the cellular structure of the foam layer. Cell collapse continues to be a problem even when the pressure at the nip of the embosser is reduced below the minimum amount needed to obtain reasonably good depth and detail of the embossed pattern.

An alternate approach has been to cool the three-layer composite sheet after heating tunnel expansion of the foamable layer, wind it up on a storage reel, and then, as a separate operation, emboss it by carefully heating only the plastic film surface layer above its softening temperature either before or during its passage through the embosser. But this method requires exacting control of the heating of the surface layer so that it is rendered sufficiently impressionable for good embossing without also softening portions of the underlying foam layer enough to cause undue cell collapse. Moreover, the intermediate cooling, winding and reheating operations require enough addiitonal time, apparatus and plant space to point up the need for an improved method of embossing the material while it is still hot from the foaming step.

It is therefore the primary object of this invention to provide a new and improved method of making sheet materials having an embossed layer of non-foamed plastic in superposed adherence with a layer of foamed plastic.

A more specific object is the provision of a method of making flexible, resilient sheet materials having an embossed, wear-resistant layer of non-foamed thermoplastic resin in superposed adherence with a foamed layer of similar thermoplastic resin.

Another object is the provision of a rapid, efficient, continuous method of making flexible, resilient sheet materials having an embossed, wear-resistant layer of non-foamed plasticized polyvinyl chloride in superposed adherence with a fabric-backed layer of foamed plasticized polyvinyl chloride.

Other important objects will be apparent from the description of the invention which follows.

The novel method of this invention, in broad terms, comprises (1) Forming a composite plastic sheet material comprising a layer of nonfoamed thermoplastic resin in superposed adherence with a layer of foamed thermoplastic resin, (2) Heating said sheet material until each of said layers is heated to at least its softening point, (3) Before either of said layers cools below its softening point, embossing the layer of nonfoamed resin by passing the sheet material through the nip of a roller embosser in which the nip has a predetermined fixed clearance which is greater than the total thickness of the non-foamed portion of the sheet material in an amount equal to 30–90% of the thickness of the foamed resin portion, and (4) Cooling the resulting embossed composite sheet material to room temperature.

A preferred form of the invention comprises (1) Calendering a layer of foamable polyvinyl chloride calender composition containing a heat-decomposable blowing agent into superposed adherence with a continuous length of fabric, (2) Calendering a layer of nonfoamable polyvinyl chloride calendar composition into superposed adherence with the foamable layer, each of said polyvinyl chloride layers during calendering being heated to at least its softening point but below the decomposition temperature of the blowing agent, (3) Continuously passing the resulting continuous length of composite sheet material through a heat zone at a temperature sufficient to decompose the blowing agent and thereby foam the foamable layer into a cellular structure, (4) Without allowing either of the polyvinyl chloride layers to cool below its softening point, continuously passing the sheet material through the nip of a roller embosser in which the nip has a predetermined fixed clearance which is greater than the total thickness of the non-foamed portion of the sheet material in an amount equal to 30–90% of the thickness of the foamed resin portion, at least one of the rolls of the embosser being driven so that its peripheral surface speed equals the speed at which the sheet is advanced towards the nip, and (5) Cooling the resulting embossed composite sheet material to room temperature.

FIGURE 1 illustrates the process of this invention. FIGURE 2 shows the embossed layered sheet material.

The principal resinous component of both the nonfoamed surface layer and the underlying foamed layer is preferably a vinyl chloride resin, that is, polyvinyl chloride or a copolymer derived from at least 50 weight percent of vinyl chloride and up to 50 weight percent of one or more other ethylenically unsaturated monomers copolymerizable therewith, such as vinyl acetate, vinylidene chloride, ethyl fumarate, and diethyl maleate. It is also preferred to blend a plasticizer with the vinyl chloride resin.

Other polymeric materials which are at least initially thermoplastic enough to be foamable and embossable can also be used as the principal resinous component of either or both of the essential plastic layers, such as polyethylene, certain chlorosulfonated polyethylenes, and certain copolymers of arcylonitrile, butadiene and styrene.

The foamable layer can be formed on a calender from known thermoplastic calender compositions which have had a suitable blowing agent incorporated therein by mixing at a temperature below the decomposition temperature of the blowing agent. Other known methods of forming foamed or foamable layers of thermoplastic resins are also useful in preparing the composite plastic sheet material to be embossed in accordance with this invention. For example, a plastisol composition which has a suitable blowing agent (see U.S. Patent 2,888,414) or gas (see U.S. Patent 2,763,475) incorporated therein can be applied to a substrate as a foamed or foamable layer. A foamable vinyl chloride resin layer can be formed by extrusion in accordance with the teaching of British Patent 853,321, page 1, column 2, lines 68–80. This patent also teaches the formation of a foamable polyethylene layer by extrusion on page 1, column 1, lines 29–42. It is usually best to use a foamable layer having a thickness within the range of 1–150 mils. The cellular structure of the foamed layer can be open-cell or closed-cell.

Suitable blowing agents are well known in the art; for example, they include such compounds as azodicarbonamide, azodiisobutyronitrile, benzene sulfonyl hydrazide, p,p′-oxybis-(benzenesulfonyl hydrazide), N,N′-dimethyl-N,N′-dinitroso terephthalamide, tert-octyl ammonium nitrate, dinitrosopentamethylenetetramine and azodiformamide. A blowing agent is selected which has a decomposition temperature compatible with the method to be employed in forming the foamed layer. Azodicarbonamide is particularly well adapted for use in the preferred calendering method.

The foamable resin layer is preferably applied to a porous fibrous substrate which will remain permanently adhered thereto, such as woven or knitted fabric or natural or synthetic fibers, nonwoven fabric, paper, natural leather or synthetic leather. It can also be applied to a performed thermoplastic film which adheres thereto as the nonfoamed surface layer of the product. The foamable layer can also be applied to a removable substrate, which can be any sheet material adapted to resist adhesion until ready to be removed, for example certain plastic films, metal foils and release papers.

Either before or after the foamable resin layer is foamed into a cellular structure it is integrally united to a layer of nonfoamable thermoplastic resin. An adhesive layer can be interposed between the two resin layers if desired to enhance the bond, although this is usually not necessary when both layers contain the same type of resin and they are combined under self-bonding conditions. The method described in Example I of U.S. Patent 2,771,388 can be employed for combining the layers continuously on a calender.

When the product is intended for upholstery applications, the nonfoamable layer is usually about 2–12 mils thick, although it is not necessarily limited to this thickness range. This layer, as well as the foamable layer, can be formed by any known coating or layer-forming method from a resin solution, latex, plastisol, calender composition, extrusion composition or the like. The most useful products obtainable by this new method have a nonfoamable layer which is highly wear resistant, flexible, embossable and not inclined to exude plasticizer.

After the foamable resin layer has been foamed and integrally united to the nonfoamable resin layer, and each of the resin layers has been heated to at least its softening point, the heat-softened composite sheet material is passed directly to the roller-embosser. Here, the nonfoamed resin layer is embossed as the sheet passes through the nip which has a fixed clearance which is greater than the total thickness of the nonfoamed portion of the sheet material in an amount equal to 30–90% of the thickness of the foamed resin portion. The percentage of the thickness of the foamed resin portion by which the nip clearance exceeds the total thickness of the nonfoamed portion of the sheet material is sometimes referred to herein as "the fixed clearance factor." Next, the embossed sheet is cooled. Surprisingly enough, substantially all the depth and detail of the engraved pattern on the embossing roll is reproduced in the nonfoamed surface layer of the product while retaining the cellular structure of the underlying foamed layer. It is quite unexpected that the embossing is so successful in view of the fact that a strong positive pressure is not exerted on the sheet at the nip of the embosser and in view of the presence of the highly compressible, easy-to-collapse layer of heat-softened foamed resin. The engraved pattern can be a deep, leather-like grain, a matte finish, or any of the other patterns commonly applied to resin coated fabrics.

The embossing roll is preferably provided with cooling means adapted to cause the temperature of the nonfoamed layer rapidly to drop below its softening point after it receives the embossed pattern. This is to help insure the retention of detail in the embossed pattern.

When the composite sheet material has an embossable layer of nonfoamable resin on both sides, both sides of the product can be embossed simultaneously by the method of this invention.

The best fixed clearance factor for the embosser nip within the 30–90% range specified for a particular set of operating conditions and for particular composite sheet material can be readily determined in advance of a production run by embossing a few samples at different degrees of clearance. Embossing patterns having a substantial amount of smooth unbroken areas are more likely to require a fixed clearance factor near 30%, whereas patterns which are relatively free of smooth areas (that is, substantially completely broken up with numerous closely spaced grooves, indentations, ridges and the like) are more likely to tolerate a fixed clearance factor near 90%. It will be understood that these are the percentages of the thickness of the foamed resin portion by which the nip clearance exceeds the total thickness of the nonfoamed portion of the sheet material.

A fixed clearance factor substantially below 30% results in excessive collapse of the cellular structure. On the other hand, a fixed clearance factor substantially above 90% results in poor reproduction of the embossing roll pattern.

The new and improved method of this invention has the important advantage of being surprisingly well adapted to the rapid, economical continuous manufacture of composite plastic sheet material having an embossed wear resistant surface layer of nonfoamed plastic and an underlying layer of foamed plastic. The method permits the heat-softened sheet to be passed directly from the heated foaming zone into the nip of the embosser, thereby eliminating the costly and time-consuming prior art steps which include cooling and surface-heating between the steps of foaming the foamable layer and embossing the surface layer. Deep grain patterns and other attractive embossed surface textures are obtainable.

The method can also be used to advantage for embossing sheet material which has been allowed to cool following the formation of the nonfoamed/foamed composite since less precise controls are needed when heating the entire thickness of the sheet than when heating only the surface layer to softening temperature. Moreover, there is evidence that having both the foamed and nonfoamed layers in a heat-softened condition as the sheet enters the embossing nip leads to improved interlayer adhesion in the finished product.

This novel method also has advantageous utility in the simultaneous embossing of both sides of a composite sheet having a foamed resin layer sandwiched between two nonfoamed resin layers, even when the latter have different softening points. It was very difficult to achieve this by prior methods.

The following examples are given for the purpose of illustrating the invention; all quantities shown are on a weight basis unless otherwise indicated.

*Example 1*

This example illustrates a continuous method for economically mass-producing an embossed polyvinyl chloride upholstery material that contains a resilient foamed layer of the resin, the product having important advantages over polyvinyl chloride coated fabrics which contain no foam layer.

A foamable polyvinyl chloride calender composition containing a heat-decomposable blowing agent is prepared by admixing the blowing agent, the resin and other ingredients at a temperature below the decomposition temperature of the blowing agent. The calender composition has a formula as follows:

| | Parts by weight |
|---|---|
| Polyvinyl chloride ("Marvinol" VR-21) | 100.0 |
| Dioctyl phthalate | 80.0 |
| Barium-cadmium laurate ("Ferro 1820") | 1.0 |
| Diphenyl phosphite ("Ferro 903") | 1.0 |
| Epoxidated glycidyl ether ("Ferro 900") | 1.0 |
| Stearic acid | 0.5 |
| Azodicarbonamide blowing agent | 15.0 |
| | 198.5 |

The ingredients are blended in an internal mixer for 10 minutes at room temperature, then fluxed on a mill at 160° C. until a homogeneous mass is obtained. Then a layer of the foamable composition having a thickness of 10 mils is calendered at 165° C. into superposed adherence with a running length of knitted fabric weighing 3.5 ounces per square yard and measuring 40 inches in width. Next, a layer of nonfoamable calender composition having a thickness of 5 mils is calendered into superposed adherence with the foamable layer at 165° C. The nonfoamable layer of resin has the same composition as the foamable layer except for the omission of the azodicarbonamide and the addition of 15 parts of pigment. The total thickness of the nonfoamed portion of the sheet material (fabric and nonfoamed resin layer) is 20 mils.

The resulting continuous length of composite sheet material is continuously passed through a heat zone at atmospheric pressure where it is subjected to a temperature of 216° C. for 7 minutes. This causes the blowing agent to decompose, transforming the foamable layer into a cellular structure of fine cells of fairly uniform size. The sheet material now has an overall thickness of 60 mils (i.e., 0.060 inch). The thickness of the foamed resin layer is 40 mils.

While both the foamed resin layer and the nonfoamed resin layer are in the heat-softened condition resulting from the foaming step, the composite sheet is passed directly from the foaming heat zone into the nip of a roller embosser in which the nip has a fixed clearance of 45 mils. In other words, the engraved embossing roll and the back-up roll are mounted so that there is a fixed space between them of 45 mils. Since the nip clearance of 45 mils is 25 mils greater than the 20 mil total thickness of fabric and nonfoamed resin, and since the foamed resin layer thickness is 40 mils, the percentage of the foamed layer thickness by which the nip clearance exceeds the thickness of the nonfoamed portion is 62.5% (25/40×100). Thus, the fixed clearance factor is 62.5%.

The embossing roll is engraved with a deep leather-like grain. Both rolls of the embosser are equipped with driving means synchronized with the roller which advances the sheet material towards the nip such that the peripheral surface speed of the embosser rolls equals the speed at which the sheet is advanced towards the nip. This prevents undue distortion of the distortion-susceptible softened resin layers.

Cooling water is circulated through the embosser rolls to cause the temperature of the heat-softened plastic rapidly to drop below its softening point as soon as the nonfoamed layer has received the grain pattern of the engraved embossing roll, thereby "freezing" the detail of the pattern. The cooled embossed sheet material is wound up on a storage reel. The embossed pattern has excellent depth and sharp detail. A well-known resin solution top coat can be applied to the embossed surface of the cooled sheet if it is desired to modify its luster or tactile properties.

The product of this example is eminently useful as an automobile upholstery and interior trim material. It is also useful for the manufacture of jackets, shoe uppers, wall covering, bookcovers, handbags, carrying cases and the like. The product is attractive, wear-resistant, resilient, drapable, easy to clean, light in weight and resistant to delamination or separation of the layers. It is more resistant to delamination when immersed in toluol for several minutes than similar products made by prior art methods.

*Example 2*

Two hundred linear yards of composite sheet material having a foamed resin layer in interposed adherence with a fabric and a nonfoamed resin layer is prepared by following the teaching of Example 1 through the step of transforming the foamable layer into a cellular structure. The sheet material is passed from the heat zone employed for the foaming step through a cooling zone adapted to cool it to room temperature; then it is wound up on a storage reel.

A one-hundred-yard running length of the composite sheet material is passed through a heat zone adapted to heat both the foamed and nonfoamed resin layers above their softening points. The heat softened sheet is then passed into the nip of a roller embosser in which the nip has a fixed clearance of 33 mils. The fixed clearance factor is 32.5% because the nip clearance of 33 mils is 13 mils greater than the 20 mil thickness of the nonfoamed portion, and the foamed layer is 40 mils thick; thus 13/40×100=32.5%. The 33 mil space between embosser rolls is "fixed" so as not to change during the embossing. The embossing roll is engraved with a decorative pattern containing many small smooth areas about ¼ inch in diameter separated by a series of fine grooves and dent-like indentations. Otherwise, the embossing is done the same as in Example 1, and with similar results.

The remaining one-hundred-yard length of composite sheet material is similarly heat-softened and embossed, except in this case the nip has a predetermined fixed clearance of 54 mils, which means that the fixed clearance factor is 85% (34/40×100). Also, the embossing roll is engraved with a decorative pattern consisting of a series of fine grooves separated by small closely spaced relatively deep craters. The pattern is substantially free of completely smooth areas.

Example 3

A foamable plastisol is formulated by grinding the following composition on a three-roll mill:

| | Parts by weight |
|---|---|
| Polyvinyl chloride | 100 |
| Didecyl adipate | 60 |
| Stabilizer | 3 |
| Titanium dioxide pigment | 2 |
| Azodiformamide blowing agent | 5 |
| | 170 |

A 10 mil thick layer of the plastisol is doctored onto a running length of 20 mil thick release paper which has been treated to resist adhesion to the plastisol. The foamable plastisol layer, supported by the release paper, is passed through a 200° F. heat zone to gel it.

A nonfoamable plastisol, formulated the same as the foamable plastisol used above except for the omission of the blowing agent and the addition of 5 parts more of pigment, is applied as a 10 mil layer onto the layer of foamable plastisol, and gelled in a heat zone.

Next, the assembled layers are passed through a 350° F. heat zone to fuse the plastic layers inseparably together as a composite sheet. Then the sheet is passed through a 400° F. heat zone to transform the foamable layer into a cellular structure having a thickness of 50 mils. The sheet is now 80 mils thick.

While still in a heat-softened condition, the composite sheet is embossed on the nonfoamed resin side in accordance with the teaching of Example 1, the embosser nip having a fixed clearance of 60 mils. The fixed clearance factor is 60% since the 60 mil nip clearance is 30 mils greater than the 30 mil total thickness of release paper and nonfoamed resin, and the foamed layer is 50 mils thick; thus $30/50 \times 100 = 60\%$. The release paper on the back side of the product can be left on as the sheet is cooled, wound up and shipped, and later removed at the point of use, for example just before the product is applied to a vehicle interior as decorative trim.

I claim:

1. A method which comprises (1) forming a composite plastic sheet material comprising a layer of nonfoamed thermoplastic resin in superposed adherence with a layer of foamed thermoplastic resin, (2) heating said sheet material until each of said layers is heated to at least its softening point, (3) before either of said layers cools below its softening point, embossing and cooling the layer of nonfoamed resin by passing the sheet material through the nip of a cooled roller embosser in which the nip has a predetermined fixed clearance which is greater than the total thickness of the nonfoamed portion of the sheet material by an amount equal to 30–90% of the thickness of the thickness of the foamed resin portion, and (4) cooling the resulting embossed composite sheet material to room temperature.

2. A method which comprises (1) applying a layer of foamable thermoplastic resin containing a heat-decomposable blowing agent onto a sheet-like substrate, (2) applying a layer of nonfoamable thermoplastic resin into superposed adherence with the foamable layer, (3) heating the resulting composite sheet material at a temperature sufficient to decompose the blowing agent and thereby foam the foamable layer into a cellular structure, (4) while each of said resin layers is at a temperature above its softening point, embossing and cooling the layer of nonfoamed resin by passing the sheet material through the nip of a cooled roller embosser in which the nip has a predetermined fixed clearance which is greater than the total thickness of the nonfoamed portion of the sheet material by an amount equal to 30–90% of the thickness of the foamed resin portion, and (5) cooling the resulting embossed composite sheet material to room temperature.

3. A method which comprises (1) calendering a layer of foamable polyvinyl chloride calender composition containing a heat-decomposable blowing agent into superposed adherence with a continuous length of fabric, (2) calendering a layer of nonfoamable polyvinyl chloride calender composition into superposed adherence with the foamable layer, each of said polyvinyl chloride layers during calendering being heated to at least its softening point but below the decomposition temperature of the blowing agent, (3) continuously passing the resulting continuous length of composite sheet material through a heat zone at a temperature sufficent to decompose the blowing agent and thereby foam the foamable layer into a cellular structure, (4) while each of the polyvinyl chloride layers is at a temperature above its softening point, continuously embossing and cooling the layer of non-foamed polyvinyl chloride by passing the sheet material through the nip of a cooled roller embosser in which the nip has a predetermined fixed clearance which is greater than the total thickness of the nonfoamed portion of the sheet material by an amount equal to 30–90% of the thickness of the foamed resin portion, at least one of the rolls of the embosser being driven so that its peripheral surface speed equals the speed at which the sheet is advanced towards the nip, and (5) cooling the resulting embossed composite sheet material to room tempreature.

References Cited by the Examiner

UNITED STATES PATENTS

| | | | |
|---|---|---|---|
| 2,341,979 | 2/44 | Cunnington | 156—79 |
| 2,609,568 | 9/52 | Getchell. | |
| 2,759,866 | 8/56 | Seymour. | |
| 2,771,388 | 11/56 | Rocky et al. | 156—242 |
| 2,801,949 | 8/57 | Bateman | 156—322 |
| 2,877,151 | 3/59 | Doherty et al. | 156—209 |
| 2,946,713 | 7/60 | Dusina et al. | |

EARL M. BERGERT, *Primary Examiner.*

UNITED STATES PATENT OFFICE
CERTIFICATE OF CORRECTION

Patent No. 3,196,062                                   July 20, 1965

Edward Kristal

It is hereby certified that error appears in the above numbered patent requiring correction and that the said Letters Patent should read as corrected below.

Column 7, line 53, strike out "of the thickness".

Signed and sealed this 21st day of December 1965

(SEAL)
Attest:

ERNEST W. SWIDER                                     EDWARD J. BRENNER
Attesting Officer                                          Commissioner of Patents